(12) United States Patent
Arifuku

(10) Patent No.: US 12,452,088 B2
(45) Date of Patent: Oct. 21, 2025

(54) MANAGEMENT SYSTEM, CONTENT MANAGEMENT METHOD, AND STORAGE MEDIUM THAT ARE CAPABLE OF PREVENTING USER FROM DESIGNATING INCORRECT CONTENT FROM AMONG PLURALITY OF CONTENTS RELATED TO EACH OTHER AS CONTENT USED TO DETERMINE AUTHENTICITY

(71) Applicant: CANON KABUSHIKI KAISHA, Tokyo (JP)

(72) Inventor: Hironobu Arifuku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 18/437,011

(22) Filed: Feb. 8, 2024

(65) Prior Publication Data
US 2024/0275618 A1    Aug. 15, 2024

(30) Foreign Application Priority Data
Feb. 13, 2023 (JP) ................. 2023-019929

(51) Int. Cl.
*H04L 9/00* (2022.01)
*G06V 10/74* (2022.01)
*H04L 9/06* (2006.01)
*H04L 9/32* (2006.01)

(52) U.S. Cl.
CPC .............. *H04L 9/50* (2022.05); *G06V 10/761* (2022.01); *H04L 9/0643* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 7,941,667 B2* | 5/2011 | Miyazaki | G06F 21/64 713/176 |
| 2009/0087038 A1* | 4/2009 | Okada | G06V 40/175 382/118 |

(Continued)

FOREIGN PATENT DOCUMENTS

| | | |
|---|---|---|
| JP | 2017-204706 | 11/2017 |
| JP | 2017-204706 A | 11/2017 |

*Primary Examiner* — Lashonda Jacobs-Burton
(74) *Attorney, Agent, or Firm* — Venable LLP

(57) ABSTRACT

A management system capable of preventing a user from designating an incorrect content is provided. The management system includes a receiving unit to receive a plurality of contents and a plurality of hash values, a determining unit to determine whether or not the plurality of contents are related to each other, a generating unit to generate one authenticity guarantee number when the plurality of contents are related to each other and generate different authenticity guarantee numbers when the plurality of contents are not related to each other, and a registering unit to register the generated one authenticity guarantee number or the generated authenticity guarantee numbers, and the plurality of hash values in a blockchain. The registering unit writes one authenticity guarantee number and a hash value of a content corresponding to the one authenticity guarantee number into one block and connects the one block to the blockchain.

12 Claims, 11 Drawing Sheets

(56) References Cited

U.S. PATENT DOCUMENTS

| | | | |
|---|---|---|---|
| 2009/0190189 A1* | 7/2009 | Suga | H04L 9/321 |
| | | | 358/474 |
| 2016/0275104 A1* | 9/2016 | Kim | G06F 16/447 |
| 2016/0283920 A1* | 9/2016 | Fisher | H04L 9/3239 |
| 2024/0054507 A1* | 2/2024 | Fujita | G06Q 30/0185 |
| 2024/0205033 A1* | 6/2024 | Ueno | H04L 9/50 |
| 2024/0296250 A1* | 9/2024 | Ueno | G06F 21/64 |

* cited by examiner

MANAGEMENT SYSTEM, CONTENT MANAGEMENT METHOD, AND STORAGE MEDIUM THAT ARE CAPABLE OF PREVENTING USER FROM DESIGNATING INCORRECT CONTENT FROM AMONG PLURALITY OF CONTENTS RELATED TO EACH OTHER AS CONTENT USED TO DETERMINE AUTHENTICITY

BACKGROUND OF THE INVENTION

Field of the Invention

The present invention relates to a management system, a content management method, and a storage medium.

Description of the Related Art

In recent years, information sharing via the Internet and social networking services (SNS) has become active, and anyone is able to view and transmit information. Under such circumstances, since the technology for digital image processing has further advanced, it has become difficult for a viewer of information to confirm the authenticity of the content of the information, so that problems such as fake news have become serious. In order to cope with such problems, there is an increasing demand for a mechanism that guarantees the authenticity of digital images (i.e., guarantees that no processing or falsification has been performed with respect to the digital images).

As the mechanism for guaranteeing the authenticity of the digital images, the use of a blockchain technology widely utilized in various kinds of industries including finance has been studied. The blockchain technology can prevent falsification of digital data in a decentralized manner and at low cost.

For example, a management system using the blockchain technology registers a hash value of a content generated by a content generating apparatus and metadata accompanying the content in a blockchain as information of the content. As a result, the authenticity of the content from the time of generation of the content is guaranteed (for example, see Japanese Laid-Open Patent Publication (kokai) No. 2017-204706). For example, it becomes possible to determine the authenticity of a content designated by a user by using information of the content designated by the user from among a plurality of contents whose information has been registered in the blockchain.

Here, an image pickup apparatus functioning as the content generating apparatus includes a function of generating a plurality of contents related to each other by, for example, bracket photographing, and recording these generated contents. The plurality of generated contents have the same appearance. For this reason, when information of the plurality of contents is managed separately on the blockchain, the user needs to designate a content used to determine the authenticity from among the plurality of contents that have the same appearance, and there is a concern that the user may designate an incorrect content.

SUMMARY OF THE INVENTION

The present invention provides a management system, a content management method, and a storage medium that are capable of preventing a user from designating an incorrect content from among a plurality of contents related to each other as a content used to determine authenticity.

Accordingly, the present invention provides a management system comprising a receiving unit configured to receive a plurality of contents and a plurality of hash values respectively generated based on the plurality of contents, a determining unit configured to determine whether or not the plurality of contents are related to each other, a generating unit configured to generate one authenticity guarantee number for the plurality of contents in a case that the plurality of contents are related to each other and generate authenticity guarantee numbers different from each other for the plurality of contents in a case that the plurality of contents are not related to each other, and a registering unit configured to register the generated one authenticity guarantee number or the generated authenticity guarantee numbers, and the plurality of hash values, in a blockchain. The registering unit writes one authenticity guarantee number and a hash value of a content corresponding to the one authenticity guarantee number into one block and connects the one block to the blockchain.

According to the present invention, it is possible to prevent the user from designating the incorrect content from among the plurality of contents related to each other as the content used to determine the authenticity.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Hereinafter, a preferred embodiment of the present invention will be described in detail with reference to the drawings. It should be noted that in the preferred embodiment of the present invention, an image pickup apparatus will be described as an example of a content generating apparatus, but the content generating apparatus is not limited to the image pickup apparatus. For example, the content generating apparatus may be another apparatus that generates a content such as an apparatus that generates audio data of recorded audio, an apparatus that generates image data such as an illustration image digitally drawn by a user, or an apparatus that generates data of music composed by the user.

Figure 1:
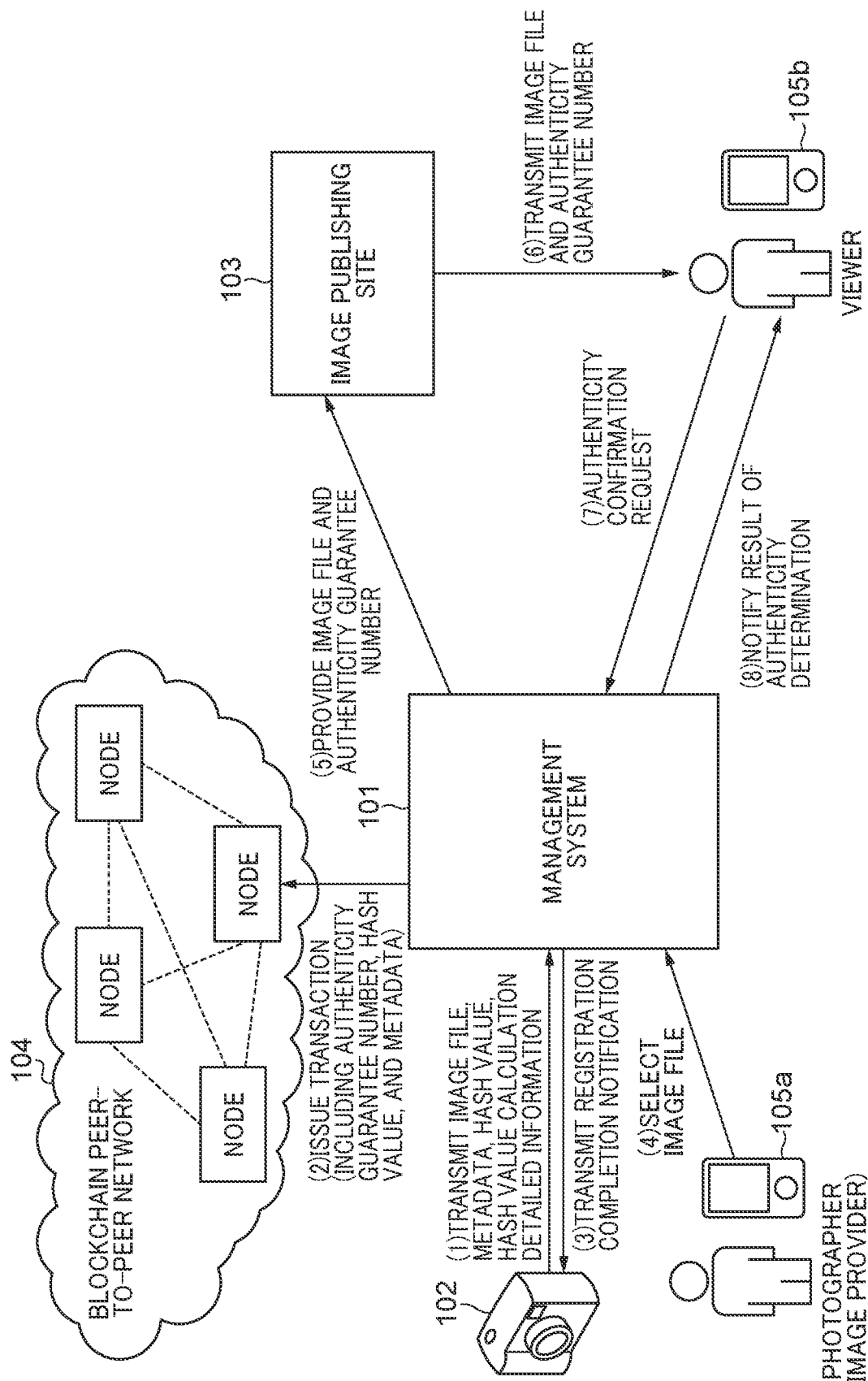
FIG. 1 is a diagram for explaining functions of a management system according to a preferred embodiment of the present invention.

FIG. 1 is a diagram for explaining functions of a management system 101 according to the preferred embodiment of the present invention.

The management system 101 includes a function of managing contents acquired from an external apparatus such as an image pickup apparatus 102 via the Internet or the like. The management system 101 is implemented by one or more computer apparatuses. It should be noted that in the preferred embodiment of the present invention, although a configuration, in which the management system 101 also communicates with and uses a blockchain peer-to-peer network 104, will be described below, the present invention is not limited to this configuration, and may be implemented by using another network.

As shown in FIG. 1, when the image pickup apparatus 102 performs a photographing operation (an image pickup operation), the image pickup apparatus 102 associates an image file obtained by the photographing operation, a hash value (an image hash value), and hash value calculation detailed information with each other, and then transmits them to the management system 101 (a step (1)). The image file includes image data and metadata. Furthermore, the image data is still image data or moving image data. The metadata includes attribute information of the image data that indicates a photographer of the image data, a photographing time, a photographing location, a model of the image pickup apparatus, a serial number of the image pickup apparatus, setting values at the time of photographing, etc. The hash value is a value obtained by executing a hash function with respect to the image file at the time of generation.

It should be noted that in the case that a plurality of image files related to each other are generated with a predetermined photographing setting, the image pickup apparatus 102 transmits the plurality of image files obtained by a photographing operation based on the predetermined photographing setting, a plurality of hash values corresponding to the plurality of image files, and hash value calculation detailed information to the management system 101.

Examples of the predetermined photographing setting include a still image bracket photographing setting (a setting about bracket photographing of still images), a still image RAW and JPEG photographing setting (a setting about RAW and JPEG photographing of still images), a setting about still image photographing with the same writing, a setting about moving image photographing with the same writing, a moving image proxy photographing setting (a setting about proxy photographing of moving images), and a setting about simultaneous recording of different types of moving images. In the bracket photographing, three still image files are generated by changing a photographing condition such as an exposure parameter. In the RAW and JPEG photographing, two still image files with different data formats, which are a RAW file and a JPEG file, are generated. In the still image photographing with the same writing, two identical still image files are generated. In the moving image photographing with the same writing, two identical moving image files are generated. In the proxy photographing, two moving image files, which are a main moving image file with high image quality and a highly compatible sub moving image file, are generated. In the simultaneous recording of different types of moving images, two moving image files with different file structures are generated.

The hash value calculation detailed information is information describing how to thin out the image data included in the image file in the case of thinning out the image data included in the image file and applying the hash function to it. It should be noted that an algorithm of the hash function to be used may be only a default algorithm, or one of a plurality of algorithms such as the secure hash algorithm 256-bit (SHA256) and the message digest algorithm 5 (MD5) may be selected as the algorithm of the hash function to be used. In the latter case, the algorithm used for calculation of the hash value is also described in the hash value calculation detailed information. For example, in the case of hashing the image data by the SHA256, the SHA256 is an algorithm that generates a hash value of 32 bytes (256 bits) by repeatedly performing an arithmetic processing with respect to the image data from the beginning to the end of the image data by 64 bytes. Repeatedly using 64 bytes from the beginning of the image data for the arithmetic processing and skipping the next 64 bytes without using for the arithmetic processing with respect to all the image data will halve a computational amount of the arithmetic processing. The hash value calculation detailed information in this case can be expressed as "Algorithm, SHA256, Read, 64, Skip, 64" or the like in a comma separated value file format (a CSV file format). Furthermore, in the case that the image data is moving image data, it is also possible to apply the hash function every other frame of the moving image data. The hash value calculation detailed information in this case can be expressed as "Algorithm, SHA256, SkipFrame, 1," or the like in the CSV file format. Further, in combination with this, even within one frame, all the data is not used but the data can be thinned out. The hash value calculation detailed information in this case can be expressed as "Algorithm, SHA256, SkipFrame, 1, Read, 64, Skip, 64" or the like in the CSV file format.

It should be noted that the format of the hash value calculation detailed information is not limited to the CSV file format. For example, the format of the hash value calculation detailed information may be a widely-used file format such as a JavaScript object notation file format (a JSON file format) or may be a unique file format.

It should be noted that in the preferred embodiment of the present invention, although the configuration, in which the image pickup apparatus 102 generates the hash value and transmits the hash value to the management system 101, will be described below, the present invention is not limited to this configuration, and for example, the management system 101 may generate the hash value based on the image file obtained from the image pickup apparatus 102.

Upon receiving the image file, the hash value, and the hash value calculation detailed information from the image pickup apparatus 102, the management system 101 of the preferred embodiment of the present invention generates an authenticity guarantee number, which is a unique number within the management system 101. The authenticity guarantee number is an identification number for uniquely identifying the image file. It should be noted that in the case of receiving the plurality of image files related to each other from the image pickup apparatus 102, the management system 101 generates one authenticity guarantee number with respect to the plurality of image files related to each other.

The management system 101 generates transaction data, which includes the generated authenticity guarantee number and information of the image file corresponding to the generated authenticity guarantee number. For example, in the case of receiving one image file from the image pickup apparatus 102, the management system 101 generates transaction data, which includes one generated authenticity guarantee number and information of the one image file corresponding to the one generated authenticity guarantee number. On the other hand, in the case of receiving the plurality of image files related to each other from the image pickup apparatus 102, the management system 101 generates transaction data, which includes one generated authenticity guarantee number and information of the plurality of image files related to each other corresponding to the one generated authenticity guarantee number. The information of the image file includes, for example, the metadata included in the image file received from the image pickup apparatus 102, the hash value of this image file, and the hash value calculation detailed information corresponding to this hash value.

Next, the management system 101 connects a block, into which the transaction data has been written, to a blockchain. Specifically, the management system 101 issues the generated transaction data and broadcasts the transaction data to one or more computers (nodes) participating in the blockchain peer-to-peer network 104 (a step (2)). Accordingly, the transaction data is temporarily stored in a transaction pool, and a verification is completed when the transaction data is approved by a miner. Then, the block, into which the transaction data has been written, is generated, and is added to the tail of the blockchain. As a result, the information of the image file is registered in the blockchain.

After connecting the block, into which the transaction data has been written, to the blockchain, the management system 101 associates the one image file or the plurality of image files related to each other received from the image pickup apparatus 102 with the authenticity guarantee number and stores (provides) them in (to) an image database 407 shown in FIG. 4, which will be described below. Then, the management system 101 transmits a registration completion notification, which indicates that a processing of registering the information of the image file in the blockchain is completed, to the image pickup apparatus 102 (a step (3)).

After that, the management system 101 allows the user (for example, the photographer or an image provider) to select an image file to be published on an image publishing site 103 from a plurality of image files registered in the image database 407 (a step (4)). Specifically, the user is able to access a WEB page of the management system 101 from a communication device 105*a* operated by the user and select the image file to be published on the image publishing site 103 on the WEB page. The management system 101 provides the image file selected by the user and the authenticity guarantee number associated with the image file selected by the user to the image publishing site 103 (a step (5)). At the same time, the management system 101 notifies the communication device 105*a* that the image file selected by the user in the step (4) can be published on the image publishing site 103.

The image publishing site 103 performs a display control so that the authenticity guarantee number provided from the management system 101 together with the image file is displayed, for example, in the vicinity of the image file on the WEB page. It should be noted that the display position of the authenticity guarantee number (the vicinity of the image file) is an example, and the authenticity guarantee number may be displayed at a position where a viewer of the image publishing site 103 can recognize that it is the authenticity guarantee number corresponding to the image file.

The viewer of the image publishing site 103 may want to confirm that the image file displayed on the WEB page of the image publishing site 103 has not been falsified since the time of photographing. In this case, the viewer first uses a communication device 105*b* to obtain (download) the image file and the authenticity guarantee number associated with the image file from the image publishing site 103 (a step (6)). Specifically, the viewer accesses the WEB page of the image publishing site 103 from the communication device 105*b*, selects the image file published on the WEB page, and issues an instruction to perform a download. When the instruction to perform the download is issued, the image publishing site 103 transmits the selected image file and the authenticity guarantee number to the communication device 105*b*.

Here, the plurality of image files related to each other generated with the predetermined photographing setting have the same appearance. When information of the plurality of image files (contents) is managed separately on the blockchain, the user needs to designate an image file (a content) used to determine the authenticity from among the plurality of image files (contents) that have the same appearance, and there is a concern that the user may designate an incorrect image file (an incorrect content). In order to solve such an issue, in the preferred embodiment of the present invention, the plurality of image files (contents) related to each other are managed with one authenticity guarantee number. It should be notes that details of a processing that generates an authenticity guarantee number will be described below.

Upon the completion of the download, the communication device 105*b* transmits an authenticity confirmation request of the image file together with the obtained image file and the obtained authenticity guarantee number to the management system 101 (a step (7)). In the preferred embodiment of the present invention, the authenticity confirmation request is made by the viewer using the communication device 105*b* to attach the image file and the authenticity guarantee number that are obtained from the image publishing site 103 to an input form provided by the management system 101. However, the method for making the authenticity confirmation request is not limited to the method used in the preferred embodiment of the present invention, and for example, the authenticity confirmation request may be made by transmitting an e-mail, to which the image file and the authenticity guarantee number have been attached, to the management system 101.

When the authenticity confirmation request is transmitted from the communication device 105*b*, the management system 101 performs an authenticity determination of the image file, which is a target of the authenticity confirmation request. It should be noted that in the preferred embodiment of the present invention, although the timing for performing the authenticity determination is when the management system 101 accepts the authenticity confirmation request of the image data displayed on the image publishing site 103 from the communication device 105*b* of the viewer of the image publishing site 103, the timing for performing the authenticity determination is not limited to this timing. For example, the management system 101 may periodically perform the authenticity determination based on the image database 407. The management system 101 displays the result of the authenticity determination on the WEB page of the management system 101, or it notifies the result of the authenticity determination to the communication device 105b by e-mail (a step (8)).

Figure 2:
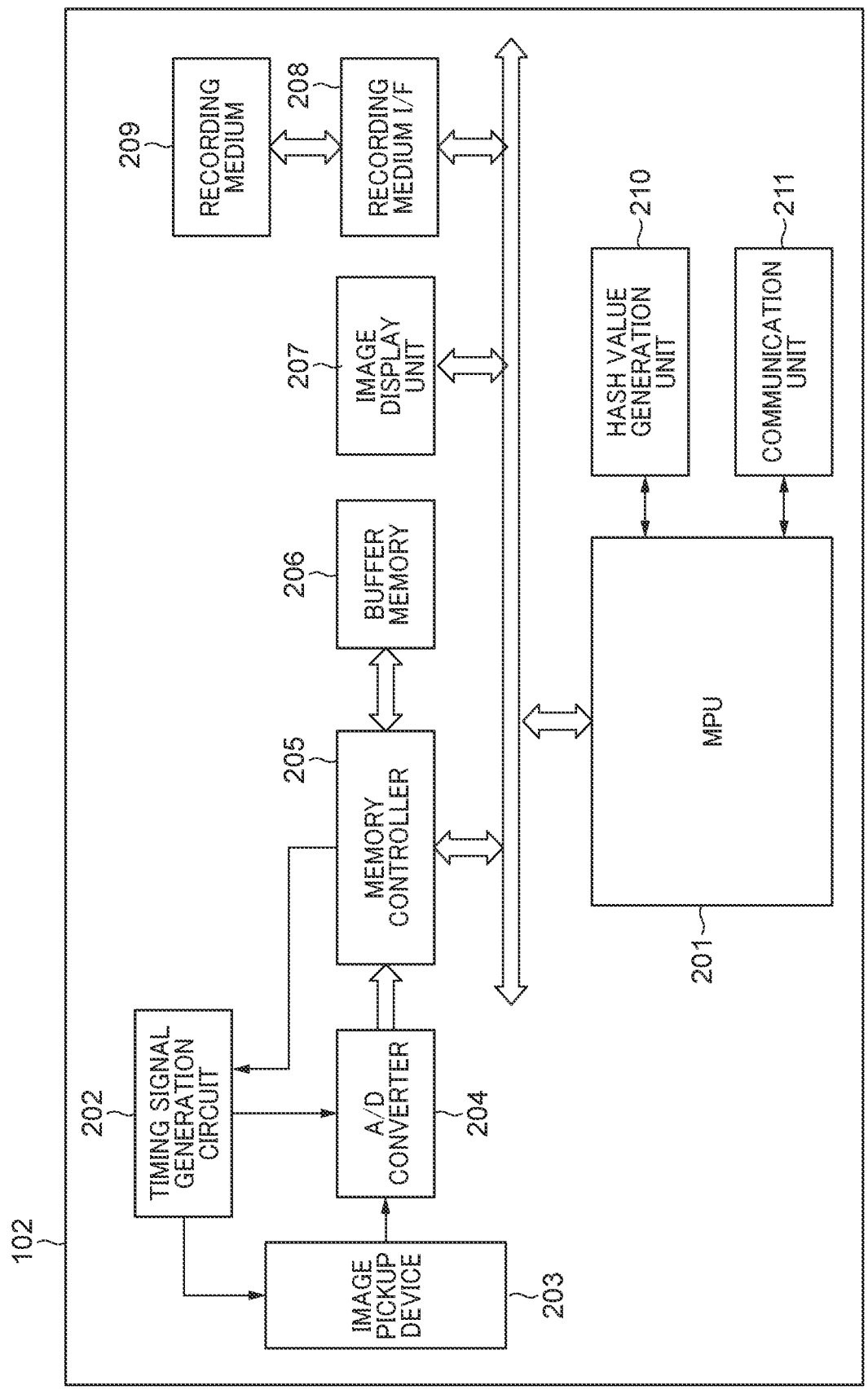
FIG. 2 is a block diagram that schematically shows a configuration of an image pickup apparatus shown in FIG. 1.

FIG. 2 is a block diagram that schematically shows a configuration of the image pickup apparatus 102 shown in FIG. 1. The image pickup apparatus 102 is a camera such as a digital camera or a digital video camera, or an electronic device having a camera function such as a mobile phone having a camera function or a camera-equipped computer.

As shown in FIG. 2, the image pickup apparatus 102 includes an MPU 201, a timing signal generation circuit 202, an image pickup device 203, an A/D converter 204, a memory controller 205, a buffer memory 206, and an image display unit 207. In addition, the image pickup apparatus 102 includes a recording medium I/F 208, a recording medium 209, a hash value generation unit 210, and a communication unit 211.

The MPU 201 is a microcontroller for performing a control related to the system of the image pickup apparatus 102 such as a photographing sequence.

The timing signal generation circuit 202 generates a timing signal necessary for operating the image pickup device 203.

The image pickup device 203 is an image pickup device such as a CCD image sensor or a CMOS image sensor that converts reflected light from a subject into electrical signals (analog image data) and reads out the electrical signals to the A/D converter 204.

The A/D converter 204 converts the analog image data, which is read out from the image pickup device 203, into digital image data. Hereinafter, the digital image data will be simply referred to as "image data".

The memory controller 205 controls reading and writing of the image file from and into the buffer memory 206, a refresh operation of the buffer memory 206, etc. The image file is an image file generated by the MPU 201 as described below, in which metadata thereof is added to the image data. Details will be described below.

The buffer memory 206 stores the image file.

The image display unit 207 displays the image file stored in the buffer memory 206.

The recording medium I/F 208 is an interface for controlling reading and writing of data from and into the recording medium 209.

The recording medium 209 is, for example, a storage medium capable of being inserted into and removed from the image pickup apparatus 102 such as a memory card, and stores programs, image files, etc.

The hash value generation unit 210 generates (calculates) the hash value by executing the hash function with respect to the image file stored in the buffer memory 206. It should be noted that instead of the hash value generation unit 210, the MPU 201 may perform the generation of the hash value. Furthermore, the hash value may be generated by executing the hash function with respect to the image data instead of the image file.

The communication unit 211 is connected to the Internet to transmit and receive data to and from an external apparatus.

Figure 3:
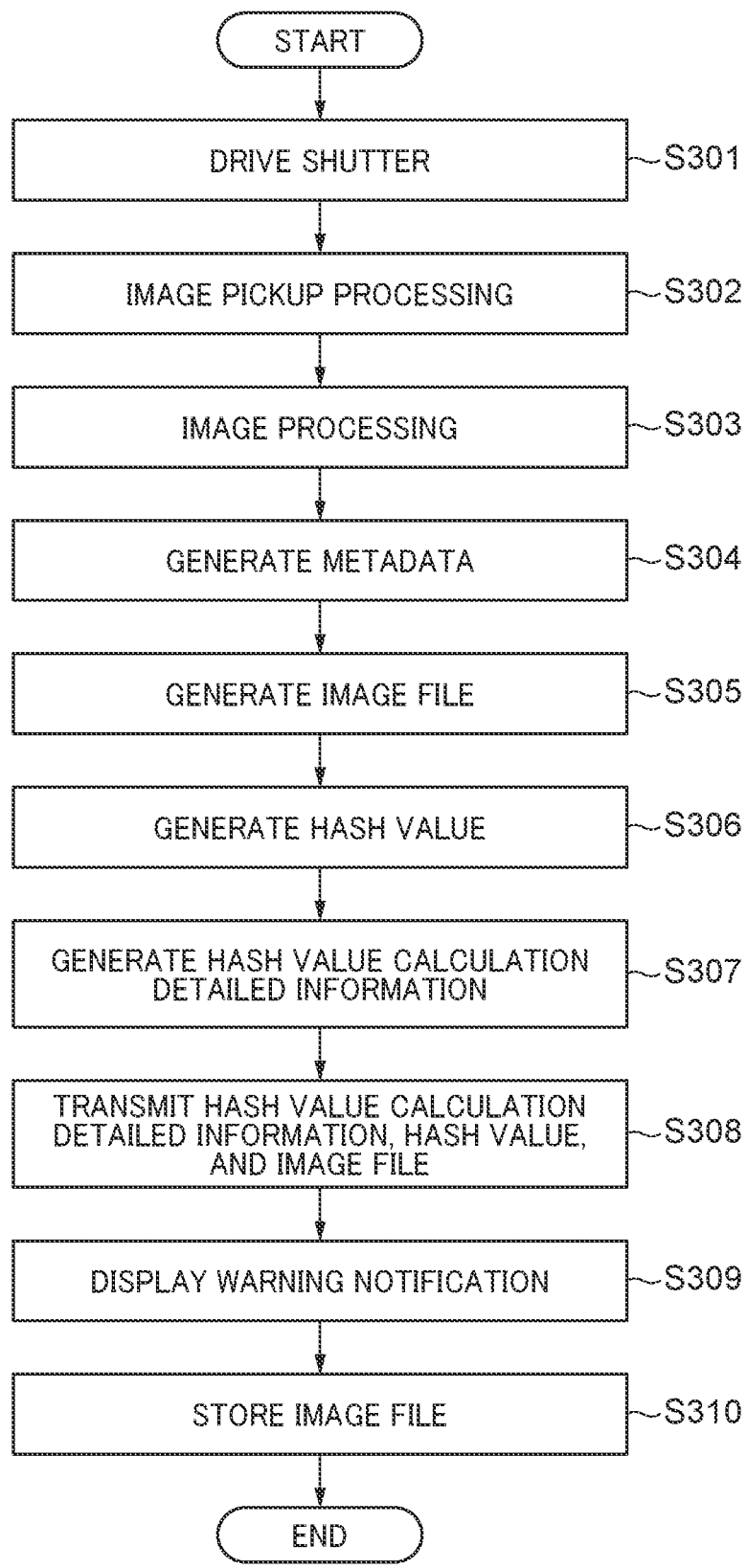
FIG. 3 is a flowchart that shows a procedure of a data transmission processing executed by the image pickup apparatus shown in FIG. 1.

FIG. 3 is a flowchart that shows a procedure of a data transmission processing executed by the image pickup apparatus 102 shown in FIG. 1. The data transmission processing shown in FIG. 3 is implemented by the MPU 201 of the image pickup apparatus 102 executing the program stored in the recording medium 209 or the like. The data transmission processing shown in FIG. 3 is started when the image pickup apparatus 102 accepts a photographing start operation such as pressing down of a photographing button (not shown) of the image pickup apparatus 102 performed by the photographer.

As shown in FIG. 3, in order to control an exposure time, the MPU 201 drives a shutter (not shown) disposed on the subject side of the image pickup device 203 (a step S301).

Next, the MPU 201 performs an image pickup processing that converts the light from the subject, which is received by the image pickup device 203 via the shutter, into the electrical signals (the analog image data) (a step S302).

Next, the MPU 201 performs image processes such as development and encoding with respect to the electrical signals obtained by the image pickup processing (a step S303). As a result, the image data is generated. It should be noted that in the case that the predetermined photographing setting, which generates the plurality of image files related to each other, is made, the MPU 201 generates a plurality of pieces of image data by performing the image pickup processing of the step S302 and the image processes of the step S303 a plurality of times.

Next, the MPU 201 generates metadata, which includes the attribute information when the image pickup processing for generating the image data is executed (the photographer, the photographing time, the photographing location, the model of the image pickup apparatus, the serial number of the image pickup apparatus, the setting values at the time of photographing, etc.) (a step S304).

Next, the MPU 201 generates an image file in a JPEG format, an MPEG format, or the like, in which the metadata described above is added to the image data described above (a step S305).

Next, the MPU 201 controls the hash value generation unit 210 to execute the hash function with respect to binary data of the generated image file to generate the hash value (a step S306). It should be noted that in the case that the predetermined photographing setting, which generates the plurality of image files related to each other, is made, in the step S305, a plurality of image files are generated, and in the step S306, a plurality of hash values corresponding to the plurality of image files generated in the step S305 are generated.

Further, at the time of the generation (calculation) of the hash value, the hash value may be generated while a part of the binary data of the image file is skipped. In this case, the MPU 201 generates the hash value calculation detailed information, in which how the binary data of the image file has been skipped (the thinning-out method) is recorded (a step S307).

Next, the MPU 201 controls the communication unit 211 to transmit the hash value and the image file to the management system 101 (a step S308). At this time, in the case that the hash value calculation detailed information has been generated in the step S307, the hash value calculation detailed information is also transmitted to the management system 101. It should be noted that the data to be transmitted in the step S308 may be subjected to an encryption processing. Further, the MPU 201 causes the image display unit 207 to display a warning notification (a step S309). This warning notification is displayed on the image display unit 207, for example, until the registration completion notification from the management system 101 is received. This warning notification is a notification for calling attention not to insert or remove the recording medium 209, for example, until the registration in the blockchain is completed. As a result, it is possible to prevent failure of the processing of registering the information of the image file in the blockchain or failure of a processing of adding already-registered information to the image file described below due to the insertion and removal of the recording medium 209.

Next, the MPU 201 stores the image file in the recording medium 209 (a step S310), and it ends the data transmission processing shown in FIG. 3.

As described above, in the preferred embodiment of the present invention, when the image pickup apparatus 102 performs the image pickup processing, not only the image file including the image data and the metadata is recorded in the recording medium 209, but also the image file and the hash value thereof are transmitted to the management system 101. In addition, in the case that the hash value calculation detailed information has been generated in the step S307, the hash value calculation detailed information is also transmitted to the management system 101.

Furthermore, in the case that the predetermined photographing setting described above is made, not only are the plurality of image files recorded in the recording medium 209, but also the plurality of image files and the plurality of hash values thereof are transmitted to the management system 101. In addition, in the case that the hash value calculation detailed information has been generated in the step S307, the hash value calculation detailed information is also transmitted to the management system 101.

Figure 4:
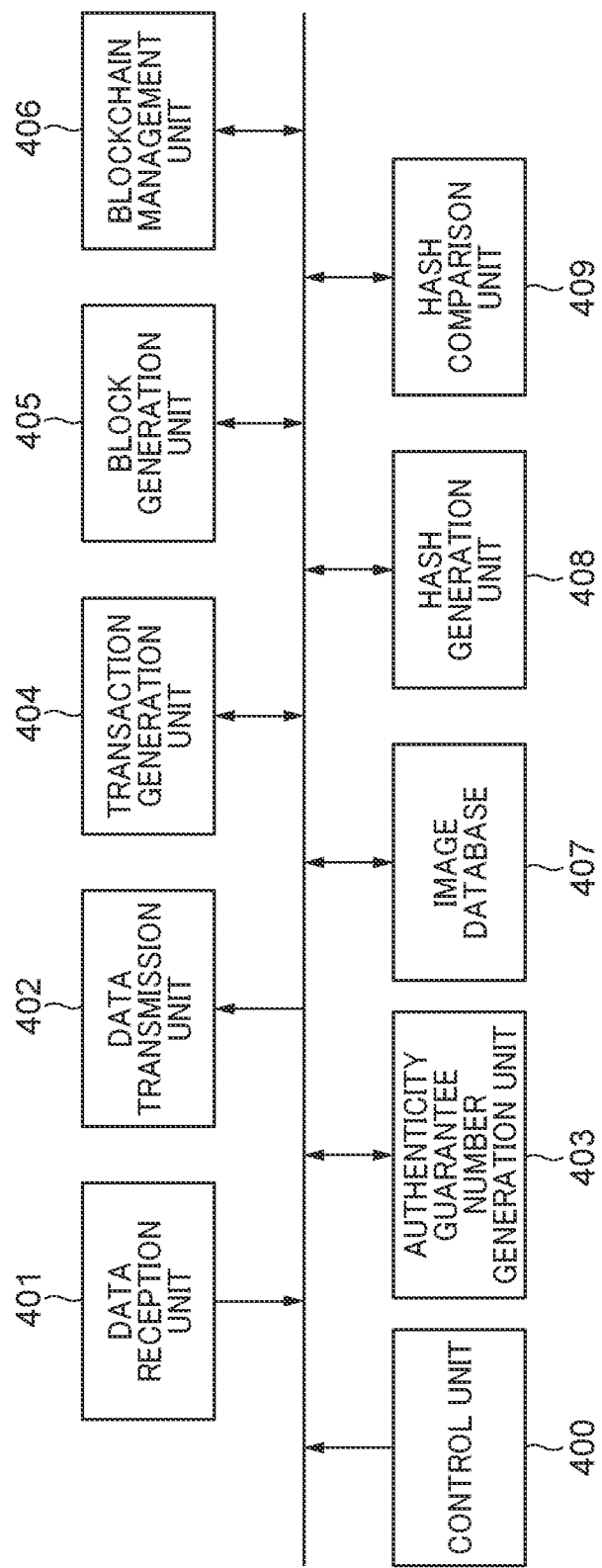
FIG. 4 is a block diagram that schematically shows a configuration of the management system shown in FIG. 1.

FIG. 4 is a block diagram that schematically shows a configuration of the management system 101 shown in FIG. 1. In the preferred embodiment of the present invention, the management system 101 includes one or a plurality of computers connected to the network.

As shown in FIG. 4, the management system 101 includes a control unit 400, a data reception unit 401, a data transmission unit 402, an authenticity guarantee number generation unit 403, and a transaction generation unit 404. In addition, the management system 101 includes a block generation unit 405, a blockchain management unit 406, the image database 407, a hash generation unit 408, and a hash comparison unit 409.

The control unit 400 (a controller) controls the entire management system 101. The control unit 400 functions as a receiving unit, a determining unit, a generating unit, a registering unit, a first receiving unit, and an authenticity determining unit.

The data reception unit 401 receives various types of data from the external apparatus. For example, the data reception unit 401 receives the hash value, the hash value calculation detailed information, and the image file from the image pickup apparatus 102. In addition, the data reception unit 401 receives the image file and the authenticity guarantee number that are used for performing the authenticity determination from the communication device 105b operated by the viewer of the image publishing site 103.

The data transmission unit 402 transmits various types of data to the external apparatus. For example, the data transmission unit 402 transmits the image file selected to be published on the image publishing site 103 and the authenticity guarantee number corresponding to the image file selected to be published on the image publishing site 103 to the communication device 105a operated by the user (for example, the photographer or the image provider)). In addition, the data transmission unit 402 transmits the result of the authenticity determination to the communication device 105b operated by the viewer who has made the authenticity confirmation request of the image file.

Upon receiving the hash value and the image file from the image pickup apparatus 102, the authenticity guarantee number generation unit 403 generates the authenticity guarantee number, which is the unique number within the management system 101. For example, in the case of receiving the plurality of image files related to each other from the image pickup apparatus 102, the authenticity guarantee number generation unit 403 generates one authenticity guarantee number with respect to the plurality of image files related to each other.

The transaction generation unit 404 generates the transaction data and broadcasts the transaction data to the one or more computers (the nodes) participating in the blockchain peer-to-peer network 104. The transaction data includes the hash value received from the image pickup apparatus 102, the authenticity guarantee number that is generated when receiving the hash value and is associated with the hash value, and the metadata included in the image file.

When the broadcasted transaction data is approved by the miner and the verification of the transaction data is completed, the block generation unit 405 generates the block, into which the transaction data has been written, and connects the generated block to the blockchain.

The blockchain management unit 406 manages the blockchain, which is also held by one or a plurality of computers (nodes) participating in the blockchain peer-to-peer network 104. In addition, the management system 101 and the nodes are synchronized so that the blockchains held by them always have the same contents.

Figure 5:
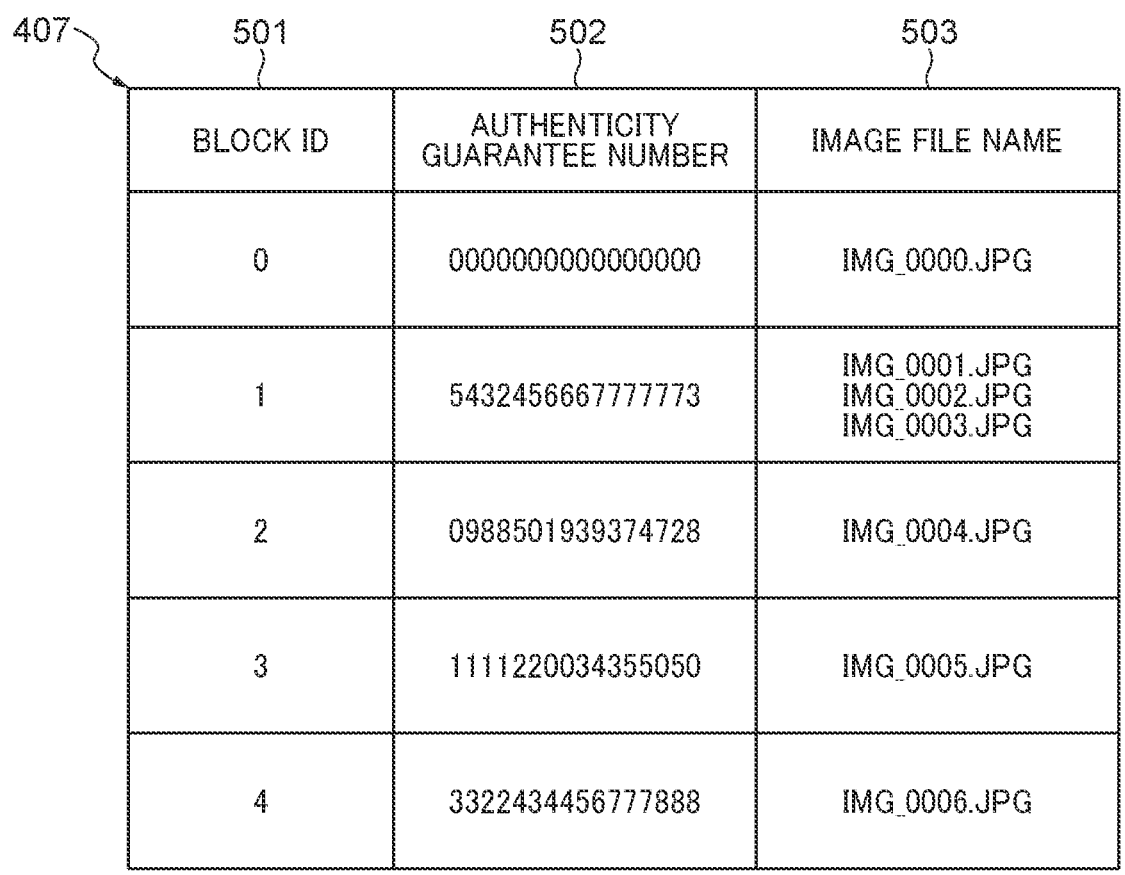
FIG. 5 is a diagram that shows an example of a configuration of an image database shown in FIG. 4.

The image file and the authenticity guarantee number corresponding to the image file are registered in the image database 407. Specifically, as shown in FIG. 5, the image database 407 includes a block ID 501, an authenticity guarantee number 502, and an image file name 503, which are associated with each other.

A block ID (an identification (ID) number) sequentially issued every time the block, into which the image file has been written, is connected to the blockchain is set in the block ID 501. That is, each block ID set in the block ID 501 corresponds to one hash value or a plurality of hash values registered in the blockchain.

The authenticity guarantee number corresponding to the image file is set in the authenticity guarantee number 502.

A file name of the image file received by the management system 101 from the image pickup apparatus 102 or the like is set in the image file name 503.

It should be noted that the configuration of the image database 407 is not limited to the above-described configuration, and the image database 407 may include other items.

Returning to FIG. 4, when performing the authenticity determination, the hash generation unit 408 generates the hash value by executing the hash function with respect to the image file transmitted from the communication device 105b of the user (the viewer) who has made the authenticity confirmation request.

The hash comparison unit 409 obtains a block (described below) corresponding to the authenticity guarantee number transmitted from the user who has made the authenticity confirmation request, from the blockchain managed by the blockchain management unit 406. Then, one or a plurality of hash values (image hash values) written into the block in the blockchain are obtained. The hash comparison unit 409 performs the authenticity determination by comparing the hash value obtained from the block with the hash value generated by the hash generation unit 408. In the case that the hash value generated by the hash generation unit 408 matches any one of the hash values obtained from the above-described block, the hash comparison unit 409 determines that the image file transmitted from the user who has made the authenticity confirmation request has not been falsified since the time of generation of the image file (determines that the image file transmitted from the user who has made the authenticity confirmation request is authentic). On the other hand, in the case that the hash value generated by the hash generation unit 408 does not match all the hash values obtained from the above-described block, the hash comparison unit 409 determines that the image file transmitted from the user who has made the authenticity confirmation request has been falsified since the time of generation of the image file (determines that the image file transmitted from the user who has made the authenticity confirmation request is not authentic, that is, is false).

For example, there is a case where the image file distributed from the image publishing site 103 to the communication device 105b has been falsified, and the falsified image file is transmitted to the management system 101 together with the authenticity confirmation request. In the case of receiving such an authenticity confirmation request, the hash value generated by the hash generation unit 408 by executing the hash function with respect to the falsified image file is different from the hash value generated based on the image file before the falsification. In addition, in the management system 101, the hash value stored in the blockchain cannot be changed by anyone. Therefore, in the case of receiving the above-described authenticity confirmation request, the hash value generated by the hash generation unit 408 by executing the hash function with respect to the falsified image file does not match the hash value stored in the block corresponding to the authenticity guarantee number of the authenticity confirmation request in the blockchain.

Figure 6:
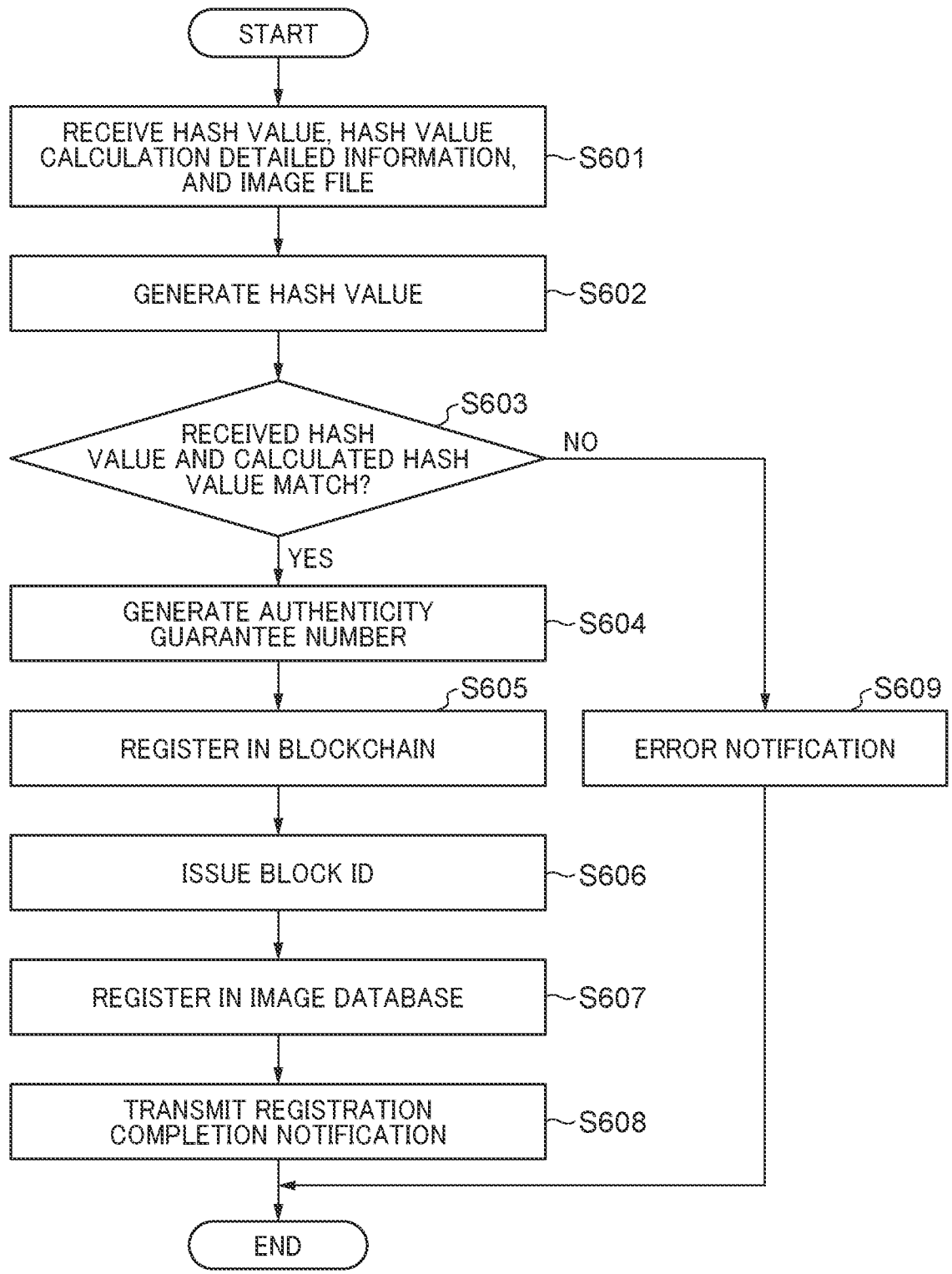
FIG. 6 is a flowchart that shows a procedure of a blockchain registration processing executed by the management system shown in FIG. 1.

FIG. 6 is a flowchart that shows a procedure of a blockchain registration processing executed by the management system 101 shown in FIG. 1. The blockchain registration processing shown in FIG. 6 is implemented by the control unit 400 executing a program stored in a recording medium included in the computer constituting the management system 101. The blockchain registration processing shown in FIG. 6 is executed, for example, when the data transmission processing shown in FIG. 3 is performed by the image pickup apparatus 102 and the hash value and the image file are transmitted from the image pickup apparatus 102 by the processing performed in the step S308. Here, a case that the hash value calculation detailed information is generated in the step S307 and the hash value calculation detailed information is transmitted to the management system 101 together with the hash value and the image file in the step S308 will be described.

As shown in FIG. 6, the control unit 400 receives the hash value, the hash value calculation detailed information, and the image file from the image pickup apparatus 102 (a step S601). In the case that the received data has been subjected to the encryption processing (the received data is encrypted), the control unit 400 performs a decryption processing with respect to the received data. Thereafter, the control unit 400 stores the information of the image file such as the hash value, the hash value calculation detailed information, and the metadata included in the received image file in a random access memory (RAM) (not shown). It should be noted that in the case of receiving a plurality of hash values, the hash value calculation detailed information, and a plurality of image files from the image pickup apparatus 102 in the step S601, information of the plurality of image files (information about the plurality of image files) is stored in the RAM (not shown).

Next, the control unit 400 applies the hash function to the image file received in the step S601 to calculate a hash value (a step S602). Then, the control unit 400 determines whether or not the hash value received in the step S601 and the hash value calculated in the step S602 match (a step S603). It should be noted that in the case of receiving the plurality of image files from the image pickup apparatus 102 in the step S601, the determination of the step S603 is performed for each received image file.

As a result of the determination of the step S603, in the case that the hash value received in the step S601 and the hash value calculated in the step S602 match, the blockchain registration processing proceeds to a step S604, which will be described below. On the other hand, as the result of the determination of the step S603, in the case that the hash value received in the step S601 does not match the hash value calculated in the step S602, the blockchain registration processing proceeds to a step S609. In the step S609, the control unit 400 issues an error notification indicating that registration in the blockchain is not possible. After that, the blockchain registration processing is ended.

In the step S604, the control unit 400 controls the authenticity guarantee number generation unit 403 to generate the authenticity guarantee number of the received image file (performs the processing that generates the authenticity guarantee number). For example, in the case of receiving the plurality of image files from the image pickup apparatus 102 in the step S601, one authenticity guarantee number is generated with respect to the plurality of image files.

Next, the control unit 400 registers the authenticity guarantee number generated in the step S602, and the information of the image file such as the hash value, the hash value calculation detailed information, and the metadata, which are stored in the RAM in the step S601, in the blockchain (a step S605). Specifically, first, the transaction generation unit 404 generates the transaction data including the authenticity guarantee number, one or a plurality of hash values, the hash value calculation detailed information, and the metadata. Next, the transaction generation unit 404 broadcasts the transaction data to the one or more computers (the nodes) participating in the blockchain peer-to-peer network 104. When the broadcasted transaction data is approved by the miner and the verification thereof is completed, the block generation unit 405 generates the block, into which the verified transaction data has been written, and connects (registers) the generated block to (in) the blockchain.

Next, the control unit 400 issues a block ID corresponding to the above-described block (a step S606). Here, the control unit 400 issues a value, which is generated by executing the hash function with respect to a header of the block twice, as the block ID. It should be noted that although the block ID is used to refer to the block, there is no field of the block ID within the block.

Next, the control unit 400 associates the issued block ID, the image file received in the step S601, and the authenticity guarantee number generated in the step S604 with each other and registers them in the image database 407 (a step S607). Next, the control unit 400 transmits the registration completion notification, which indicates that the processing of registering the information of the image file in the blockchain is completed, to the image pickup apparatus 102 (a step S608). After that, the blockchain registration processing is ended.

It should be noted that in the blockchain registration processing described above, in the case of receiving the plurality of image files from the image pickup apparatus 102 in the step S601, the authenticity guarantee number may be generated based on whether or not the plurality of image files are related to each other.

Figure 7:
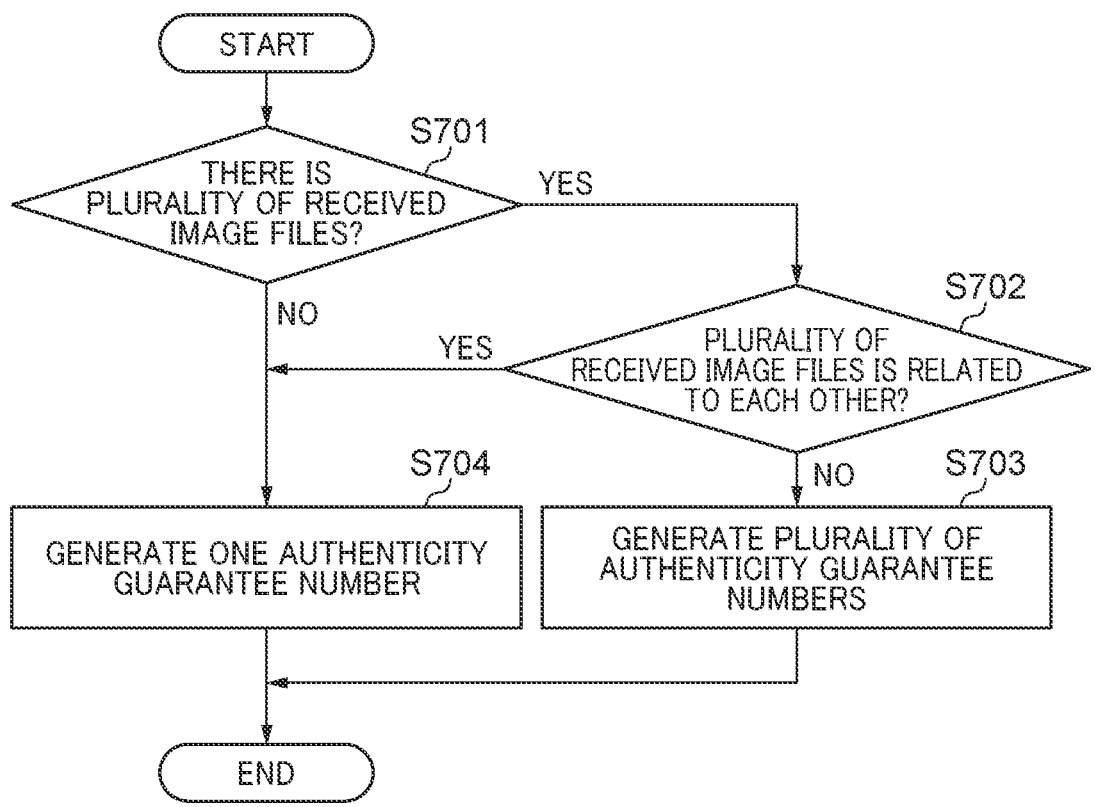
FIG. 7 is a flowchart that shows another procedure of a processing that generates an authenticity guarantee number performed in a step S604 of FIG. 6.

FIG. 7 is a flowchart that shows another procedure of the processing that generates the authenticity guarantee number performed in the step S604 of FIG. 6.

As shown in FIG. 7, the control unit 400 determines whether or not there is a plurality of image files received in the step S601 (a step S701).

In the case of being determined in the step S701 that there is a plurality of image files received in the step S601, the control unit 400 determines whether or not the plurality of image files received in the step S601 are related to each other (a step S702).

For example, the control unit 400 performs the determination of the step S702 based on whether or not related information indicating the relevance of the plurality of image files received in the step S601 has been received from the image pickup apparatus 102. By using the related information in this way, it is possible to easily determine whether or not the plurality of image files received in the step S601 are related to each other.

Alternatively, the control unit 400 performs the determination of the step S702 based on the photographing time and the serial number of the image pickup apparatus that are included in the metadata of the image file received in the step S601. For example, in the case that the plurality of image files received in the step S601 have the same serial number of the image pickup apparatus and a difference in the photographing time is within a range of expected time difference for photographing with the predetermined photographing setting, it is determined that the plurality of image files received in the step S601 are related to each other. On the other hand, in the case that the plurality of image files received in the step S601 have different serial numbers of the image pickup apparatus, or in the case that the difference in the photographing time is outside the range of expected time difference, it is determined that the plurality of image files received in the step S601 are not related to each other. By using the photographing time and the serial number of the image pickup apparatus that are included in the metadata of the image file received in this way, it is possible to determine whether or not the plurality of image files received in the step S601 are related to each other by using only the information registered in the blockchain.

Alternatively, the control unit 400 performs the determination of the step S702 based on an image similarity degree obtained by performing image analysis of all the image files received in the step S601. For example, in the case that the similarity degree between the plurality of image files received in the step S601 is greater than or equal to a predetermined value, it is determined that the plurality of image files received in the step S601 are related to each other. On the other hand, in the case that the similarity degree between the plurality of image files received in the step S601 is less than the predetermined value, it is determined that the plurality of image files received in the step S601 are not related to each other. By using the similarity degree between the plurality of image files in this way, it is possible to determine whether or not the plurality of image files received in the step S601 are related to each other by using only the image files obtained from the image pickup apparatus 102.

In this manner, in the preferred embodiment of the prevent invention, based on information other than the timing at which the image files have been received, the determination of whether or not the plurality of image files received in the step S601 are related to each other is performed.

In the case of being determined in the step S702 that the plurality of image files received in the step S601 are not related to each other, the processing that generates the authenticity guarantee number proceeds to a step S703. In the step S703, the control unit 400 controls the authenticity guarantee number generation unit 403 to generate a plurality of authenticity guarantee numbers respectively corresponding to the plurality of image files received in the step S601. In this manner, in the preferred embodiment of the prevent invention, in the case that the plurality of image files received in the step S601 are not related to each other, an individual authenticity guarantee number is generated for each of the plurality of image files received in the step S601. When the process of the step S703 is completed, the processing that generates the authenticity guarantee number is ended, and the blockchain registration processing proceeds to the step S605 of FIG. 6.

In the case of being determined in the step S701 that there is one image file received in the step S601, or in the case of being determined in the step S702 that the plurality of image files received in the step S601 are related to each other, the processing that generates the authenticity guarantee number proceeds to a step S704. In the step S704, the control unit 400 controls the authenticity guarantee number generation unit 403 to generate one authenticity guarantee number corresponding to the one image file received in the step S601 or generate one authenticity guarantee number corresponding to the plurality of image files related to each other received in the step S601. In this manner, in the preferred embodiment of the prevent invention, in the case that the plurality of image files received in the step S601 are related to each other, one authenticity guarantee number common to the plurality of image files related to each other received in the step S601 is generated. When the process of the step S704 is completed, the processing that generates the authenticity guarantee number is ended, and the blockchain registration processing proceeds to the step S605 of FIG. 6.

According to the preferred embodiment described above, in the case that a plurality of contents received from the image pickup apparatus 102 are related to each other, one authenticity guarantee number is generated with respect to the plurality of contents. That is, since the plurality of contents related to each other are managed by the one authenticity guarantee number, the user does not need to designate a content used to determine the authenticity from among the plurality of contents related to each other. As a result, it is possible to prevent the user from designating an incorrect content from among the plurality of contents related to each other as the content used to determine the authenticity.

Figure 8:
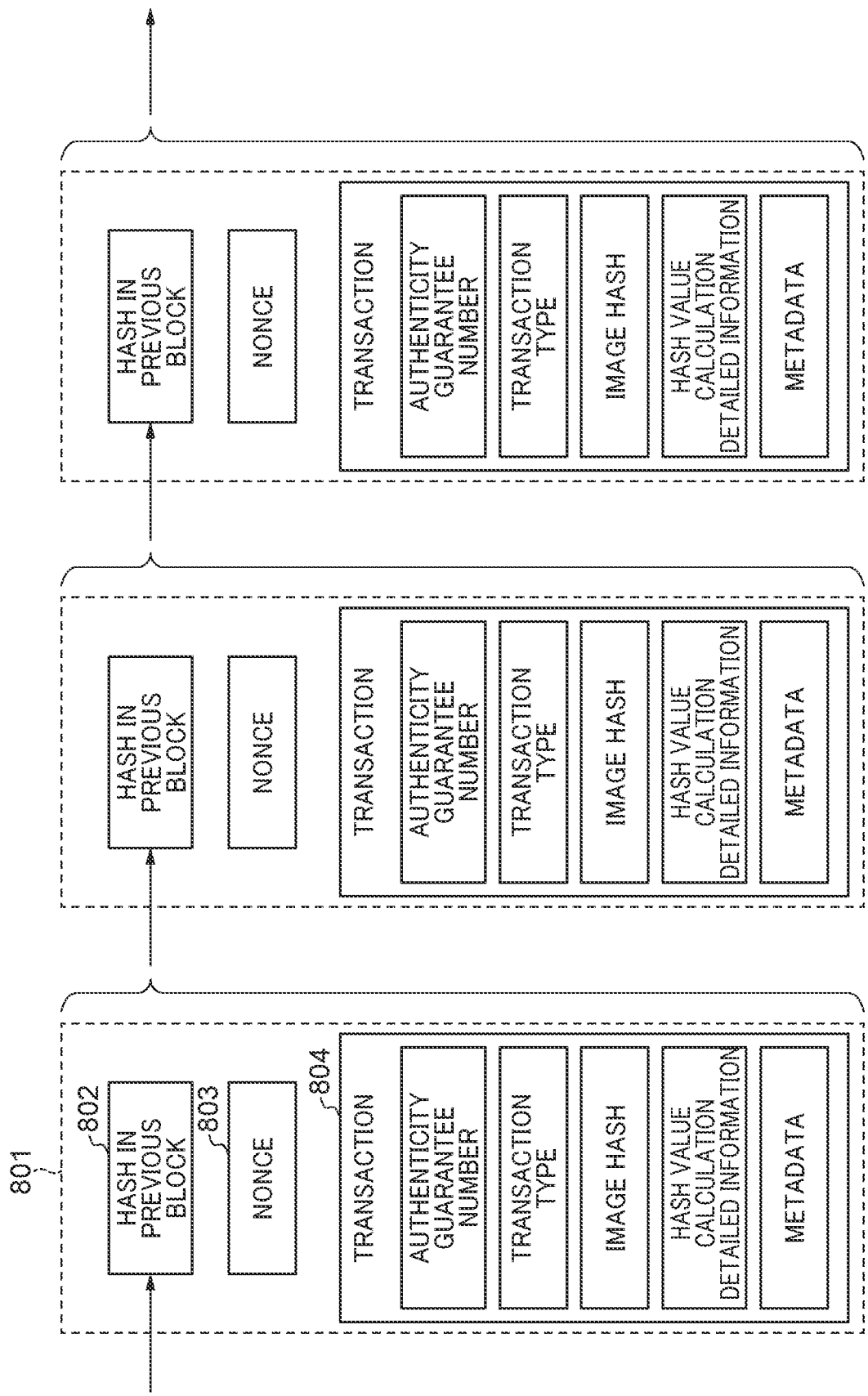
FIG. 8 is a diagram that shows an example of a block data structure of a blockchain managed by a blockchain management unit shown in FIG. 4.

FIG. 8 is a diagram that shows an example of a block data structure of the blockchain managed by the blockchain management unit 406 shown in FIG. 4. As shown in FIG. 8, the blockchain is a database formed by connecting blocks like chains in time series. A block 801 connected to the blockchain includes a hash in the previous block 802, a nonce 803, and a transaction 804.

The hash in the previous block (the hash of the previous block) 802 is a hash value of the block connected to the blockchain one block before the block 801.

The nonce 803 is a nonce value used for mining.

The transaction 804 is the transaction data generated by the transaction generation unit 404, and includes a transaction type, one or a plurality of image hash values, the authenticity guarantee number, the hash value calculation detailed information, and the metadata.

The transaction type is information indicating the type of the transaction. An internal structure of the transaction varies depending on the transaction type.

The image hash value is a hash value transmitted from the image pickup apparatus 102 to the management system 101.

The authenticity guarantee number is an authenticity guarantee number generated by the management system 101 when the image hash value is transmitted from the image pickup apparatus 102 to the management system 101.

The hash value calculation detailed information is hash value calculation detailed information transmitted from the image pickup apparatus 102 to the management system 101.

The metadata is metadata included in the image file transmitted from the image pickup apparatus 102 to the management system 101.

Figure 9:
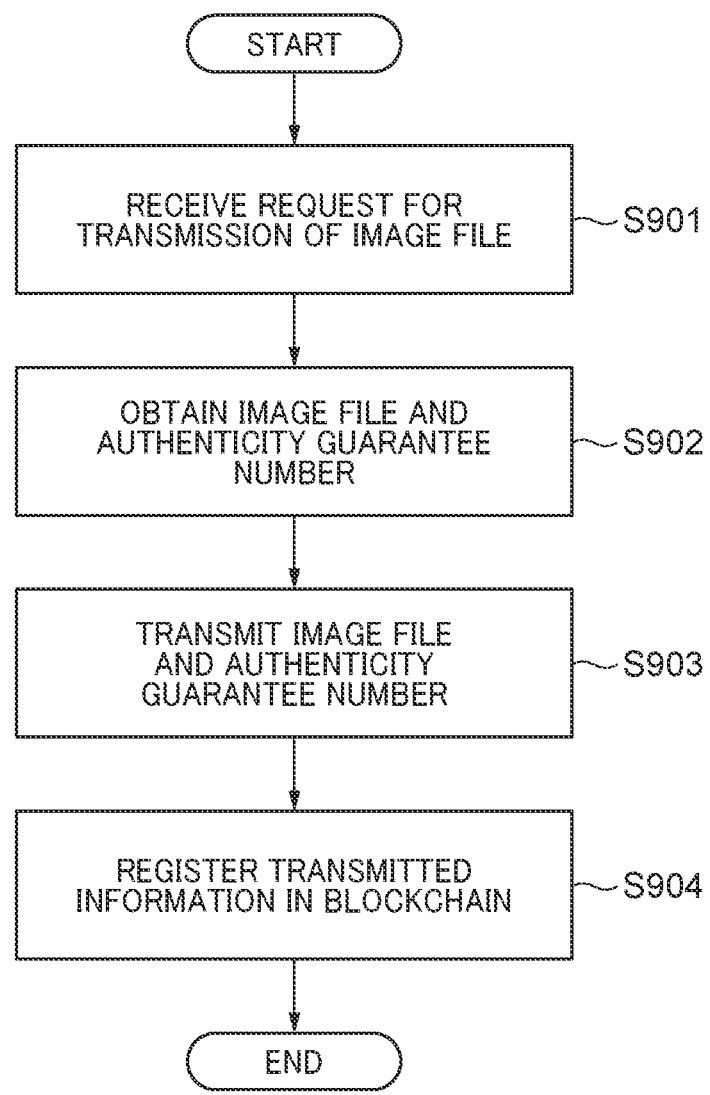
FIG. 9 is a flowchart that shows a procedure of an image file transmission processing to an image publishing site executed by the management system shown in FIG. 1.

FIG. 9 is a flowchart that shows a procedure of an image file transmission processing to the image publishing site 103 executed by the management system 101 shown in FIG. 1. The image file transmission processing shown in FIG. 9 is also implemented by the control unit 400 executing a program stored in the recording medium included in the computer constituting the management system 101. The image file transmission processing shown in FIG. 9 is executed, for example, when the user (for example, the photographer) selects one of the plurality of image files registered in the image database 407 by using the communication device 105*a* and makes a request to transmit the selected image file to the image publishing site 103 (a transmission request). The transmission request includes the block ID associated with the image file selected by the user in the image database 407.

As shown in FIG. 9, first, the control unit 400 causes the data reception unit 401 to receive the transmission request from the communication device 105*a* operated by the user (a step S901).

Next, the control unit 400 obtains the image file that is a target of the transmission request and the authenticity guarantee number of the image file from the image database 407 (a step S902). Specifically, the control unit 400 obtains the image file and the authenticity guarantee number corresponding to the block ID included in the transmission request from the image database 407.

Next, the control unit 400 causes the data transmission unit 402 to transmit the obtained image file and the obtained authenticity guarantee number to the image publishing site 103 (a step S903). At the same time, the control unit 400 notifies the communication device 105*a* (a request source of the transmission request) of the user who has made the transmission request that the image file that is the target of the transmission request can be published on the image publishing site 103.

Next, the control unit 400 registers transmission information (transmitted information) of the image file in the blockchain (a step S904). Specifically, first, the transaction generation unit 404 generates the transaction data, which includes the authenticity guarantee number, and information (such as a uniform resource locator (URL)) indicating a transmission destination of the image file and the authenticity guarantee number. Next, the transaction generation unit 404 broadcasts the transaction data to the one or more computers (the nodes) participating in the blockchain peer-to-peer network 104. When the broadcasted transaction data is approved by the miner and the verification thereof is completed, the block generation unit 405 generates the block, into which the verified transaction data has been written, and connects the generated block to the blockchain. Thereafter, the image file transmission processing is ended.

As described above, in the image file transmission processing shown in FIG. 9, when the image file is transmitted from the management system 101 to the image publishing site 103 in response to the transmission request from the user, the user is notified that the image file can be published on the image publishing site 103. At the same time, the transmission information of the image file is registered in the blockchain. Therefore, it becomes possible for the user to grasp (understand) the usage status of the image file.

Figure 10:
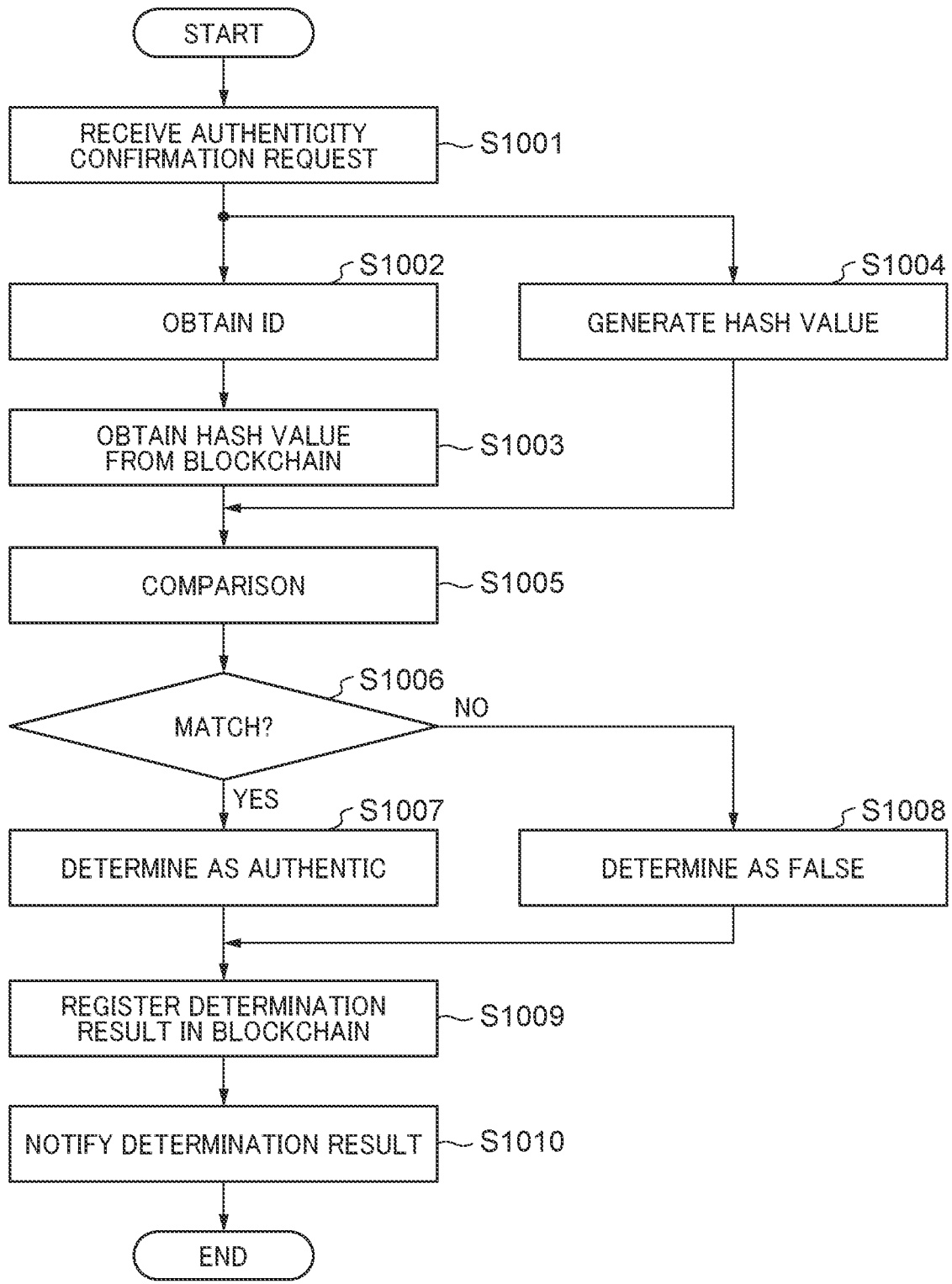
FIG. 10 is a flowchart that shows a procedure of an authenticity determination processing executed by the management system shown in FIG. 1.

FIG. 10 is a flowchart that shows a procedure of an authenticity determination processing executed by the management system 101 shown in FIG. 1. The authenticity determination processing shown in FIG. 10 is also implemented by the control unit 400 executing a program stored in the recording medium included in the computer constituting the management system 101. It should be noted that in the preferred embodiment of the present invention, the authenticity determination processing shown in FIG. 10 is executed when the viewer of the image publishing site 103 operates the communication device 105*b* to make the authenticity confirmation request of the image file displayed on the image publishing site 103 to the management system 101, but it is not limited to this.

As shown in FIG. 10, the control unit 400 causes the data reception unit 401 to receive the authenticity confirmation request from the communication device 105*b* operated by the viewer (a step S1001). At the time of receiving the authenticity confirmation request, the control unit 400 also causes the data reception unit 401 to receive the image file that is the target of the authenticity determination (the image file subject to the authenticity determination) and the authenticity guarantee number corresponding to the image file.

Next, the control unit 400 makes an inquiry to the image database 407 by using the authenticity guarantee number received in the step S1001 as a key to obtain the block ID corresponding to the authenticity guarantee number (a step S1002).

Next, the control unit 400 accesses the block corresponding to the obtained block ID in the blockchain and obtains the one or the plurality of hash values (image hash values) stored in the block (a step S1003).

Furthermore, concurrently with the processes of the steps S1002 and S1003, the control unit 400 causes the hash generation unit 408 to execute the hash function with respect to the image file received in the step S1001 (a step S1004). As a result, the control unit 400 causes the hash generation unit 408 to generate (obtain) the hash value. At this time, the control unit 400 accesses the block corresponding to the obtained block ID among a plurality of blocks constituting the blockchain to obtain the hash value calculation detailed information stored in the block. In the step S1004, the hash value is generated with reference to the hash value calculation detailed information.

When the processes of the steps S1002 to S1004 are completed, the control unit 400 causes the hash comparison unit 409 to compare the one or the plurality of image hash values obtained in the step S1003 with the hash value generated in the step S1004 (a step S1005).

The control unit 400 determines whether or not the hash value generated in the step S1004 matches any one of the one or the plurality of image hash values obtained in the step S1003 (a step S1006).

As a result of the determination performed in the step S1006, in the case that the hash value generated in the step S1004 matches any one of the one or the plurality of image hash values obtained in the step S1003, the authenticity determination processing proceeds to a step S1007. In the step S1007, the control unit 400 determines that the image file received in the step S1001 is "authentic" indicating that the image file received in the step S1001 has not been falsified since the time of generation of the image file. Thereafter, the authenticity determination processing proceeds to a step S1009.

On the other hand, as the result of the determination performed in the step S1006, in the case that the hash value generated in the step S1004 does not match all of the one or the plurality of image hash values obtained in the step S1003, the authenticity determination processing proceeds to a step S1008. In the step S1008, the control unit 400 determines that the image file received in the step S1001 is "false" indicating that the image file received in the step S0101 has been falsified since the time of generation of the image file. Thereafter, the authenticity determination processing proceeds to the step S1009.

Next, the control unit 400 controls the block generation unit 405 to register the determination result obtained in the step S1007 or the step S1008 in the blockchain (a step S1009). Specifically, the block generation unit 405 generates a block, into which the determination result obtained in the step S1007 or the step S1008 has been written, and it connects the generated block to the blockchain.

Next, the control unit 400 controls the data transmission unit 402 to notify the communication device 105b that is a request source of the authenticity confirmation request of the determination result obtained in the step S1007 or the step S1008 (a step S1010), and it ends the authenticity determination processing shown in FIG. 10.

As described above, according to the preferred embodiment of the prevent invention, the following processes are executed in the management system 101. First, in response to receiving the image file and the hash value at the time of its generation, the authenticity guarantee number for identifying the received image file is generated, and the received hash value is registered in the blockchain in association with the authenticity guarantee number. After that, in response to the authenticity confirmation request from the viewer, the hash value generated based on the image file received along with the authenticity confirmation request is compared with the hash value in the blockchain corresponding to the authenticity guarantee number received along with the authenticity confirmation request. As a result, in the management system 101, it is possible to easily determine the authenticity of the image file obtained by the viewer.

Furthermore, in the preferred embodiment of the prevent invention, the image file that the management system 101 receives from the image pickup apparatus 102 together with the hash value includes still image data or moving image data. That is, in the preferred embodiment of the prevent invention, it is possible to easily determine the authenticity of the still image data and/or the moving image data registered in the management system 101. In addition, when executing the hash function with respect to the image file, since the image pickup apparatus 102 thins out the image data included in the image file (for example, every other frame in the case that the image data is the moving image data) and applies the hash function to the image data thinned out, the calculation load is reduced. Moreover, since information regarding thinning out the image data is also linked to the blockchain as the hash value calculation detailed information and is not changed, the accuracy of determination when performing the authenticity determination processing with respect to the image file is increased.

Furthermore, in the preferred embodiment of the prevent invention, in determining the authenticity, in the case that the hash value generated based on the image file received along with the authenticity confirmation request matches any one of the plurality of hash values in the blockchain corresponding to the authenticity guarantee number received along with the authenticity confirmation request, it is determined that the image file received along with the authenticity confirmation request is authentic. In addition, in the case that the hash value generated based on the image file received along with the authenticity confirmation request does not match all the hash values in the blockchain corresponding to the authenticity guarantee number received along with the authenticity confirmation request, it is determined that the image file received along with the authenticity confirmation request is not authentic. As a result, in the management system 101, it is possible to easily determine the authenticity of the image file obtained by the viewer.

It should be noted that in the preferred embodiment of the prevent invention, in determining the authenticity, the management system 101 may compare the hash value generated based on the image file received along with the authenticity confirmation request with a hash value identified from among the plurality of hash values in the blockchain corresponding to the authenticity guarantee number received along with the authenticity confirmation request. For example, the management system 101 extracts attribute information of the image file received along with the authenticity confirmation request. In addition, based on the metadata recorded in the block corresponding to the authenticity guarantee number received along with the authenticity confirmation request, the management system 101 identifies a hash value associated with the above-described attribute information from among the plurality of hash values in the blockchain corresponding to the authenticity guarantee number. The management system 101 compares the hash value generated based on the image file received along with the authenticity confirmation request with the identified hash value in the blockchain. As a result, in determining the authenticity, it is possible to reduce the load of the processing of comparing the hash values.

It should be noted that the attribute information of the image file is, for example, codec information indicating the type of a compression method for compressing still images or moving images. For example, information indicating RAW compression and information indicating JPEG compression are extracted as attribute information of an image file generated by the above-described RAW and JPEG photographing. As a result, in determining the authenticity, in the case that the plurality of hash values in the blockchain corresponding to the authenticity guarantee number received along with the authenticity confirmation request are hash values of image files generated by the RAW and JPEG photographing, it is possible to reduce the load of the processing of comparing the hash values.

Furthermore, the attribute information of the image file is, for example, size information of the content. For example, in the above-described proxy photographing, the main moving image file has a large size such as 4K, and the sub moving image file has a small size such as full HD. These pieces of information are extracted as attribute information of the moving image file generated by the above-described proxy photographing. As a result, in determining the authenticity, in the case that the plurality of hash values in the blockchain corresponding to the authenticity guarantee number received along with the authenticity confirmation request are hash values of the moving image file generated by the proxy photographing, it is possible to reduce the load of the processing of comparing the hash values.

Furthermore, the attribute information of the image file is, for example, photographing condition information for the bracket photographing. As a result, in determining the authenticity, in the case that the plurality of hash values in the blockchain corresponding to the authenticity guarantee number received along with the authenticity confirmation request are hash values of image files generated by the bracket photographing, it is possible to reduce the load of the processing of comparing the hash values.

In the preferred embodiment of the prevent invention, in accordance with the transmission request of the image file received from the user, the image file corresponding to the hash value registered in the blockchain, and the authenticity guarantee number, which is displayed along with the image file and is registered in the blockchain in association with the hash value, are transmitted. As a result, when the user makes the authenticity confirmation request of this image file, this image file and the authenticity guarantee number of the image data can be transmitted to the management system 101. As a result, it is possible to easily determine the authenticity of this image file.

In addition, in the preferred embodiment of the prevent invention, the management system 101 includes the hash generation unit 408. As a result, it is possible to determine the authenticity of the image file based on the image file transmitted from the user without forcing the user who makes the authenticity confirmation request to generate the hash value of the image file.

In the preferred embodiment of the prevent invention, the management system 101 includes at least a first computer that generates the authenticity guarantee number of the image file and a second computer that associates the hash value at the time of the generation of the image file with the authenticity guarantee number and registers them in the blockchain. As a result, in the configuration in which the generation of the authenticity guarantee number of the image file and the registration in the blockchain are performed by different computers, it is possible to easily determine the authenticity of the image file.

In addition, in the preferred embodiment of the prevent invention, the management system 101 includes at least a plurality of computers that associate the hash value at the time of the generation of the image file with the authenticity guarantee number and register them in the blockchain. As a result, in the configuration that performs the registration in the blockchain by the plurality of computers, it is possible to easily determine the authenticity of the image file.

Here, the recording medium 209 of the image pickup apparatus 102 stores a plurality of image files generated by the image pickup processing performed by the image pickup apparatus 102. The plurality of image files also includes image files whose information has already been registered in the blockchain through the above-described processes. The user (the photographer) confirms the image files on the image display unit 207 of the image pickup apparatus 102 and organizes the image files stored in the recording medium 209 by registering the image files as favorites and deleting the image files. However, conventionally, since the image display unit 207 of the image pickup apparatus 102 does not display that which image file's information has already been registered in the blockchain, it is not possible to easily organize the image files.

In order to deal with this issue, in the preferred embodiment of the prevent invention, upon receiving the registration completion notification, which indicates that the processing of registering the information of the image file in the blockchain is completed, the already-registered information, which indicates that the information of the image file has already been registered in the blockchain, is added to the image file.

Figure 11:
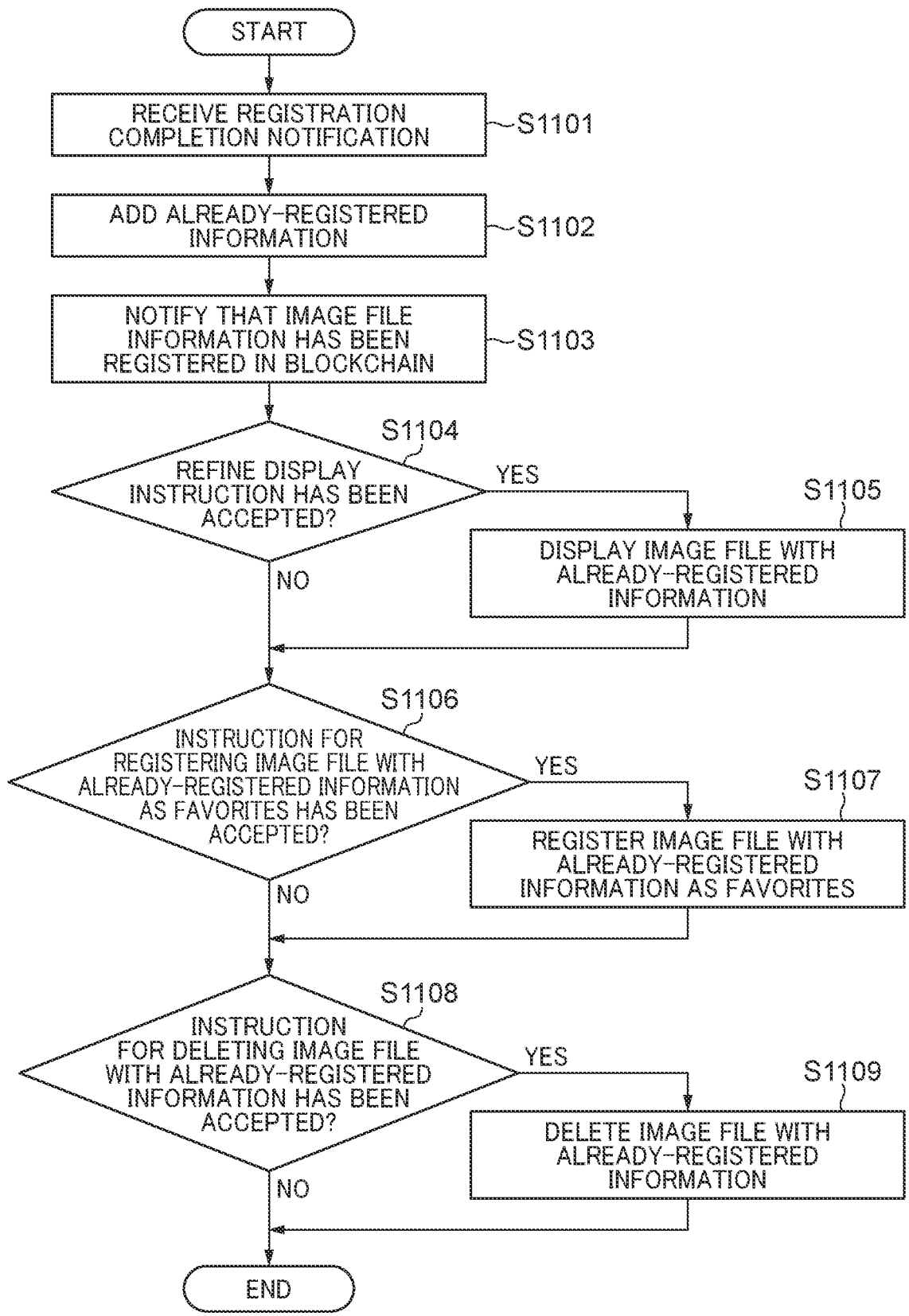
FIG. 11 is a flowchart that shows a procedure of an already-registered information adding processing executed by the image pickup apparatus shown in FIG. 1.

FIG. 11 is a flowchart that shows a procedure of an already-registered information adding processing executed by the image pickup apparatus 102 shown in FIG. 1. The already-registered information adding processing shown in FIG. 11 is implemented by the MPU 201 of the image pickup apparatus 102 executing the program stored in the recording medium 209 or the like. The already-registered information adding processing shown in FIG. 11 is executed when the management system 101 completes the processing of registering the information of the image file in the blockchain.

As shown in FIG. 11, first, the MPU 201 receives the registration completion notification from the management system 101 (a step S1101). Next, the MPU 201 adds the already-registered information to the image file (a step S1102). Specifically, the MPU 201 adds the already-registered information to the metadata included in the image file. The already-registered information is information, which indicates that the information of the image file has already been registered in the blockchain. Next, the MPU 201 notifies the user that the information of the image file has been registered in the blockchain (a step S1103). Specifically, the MPU 201 causes the image display unit 207 to display a guide to notify that the information of the image file has been registered in the blockchain. Next, the MPU 201 determines whether or not a refine display instruction (a narrowing-down display instruction) has been accepted (a step S1104).

In the case of being determined in the step S1104 that the refine display instruction has been accepted, the MPU 201 causes the image display unit 207 to display the image file including the metadata, to which the already-registered information has been added, among the plurality of image files stored in the recording medium 209 (a step S1105). It should be noted that hereinafter, the image file including the metadata, to which the already-registered information has been added, will be referred to as "an image file with already-registered information". After that, the already-registered information adding processing proceeds to a step S1106.

In the case of being determined in the step S1104 that the refine display instruction has not been accepted, the MPU 201 determines whether or not an instruction for registering the image file with already-registered information as favorites has been accepted (a step S1106).

In the case of being determined in the step S1106 that the instruction for registering the image file with already-registered information as favorites has been accepted, the MPU 201 registers the image file with already-registered information among the plurality of image files stored in the recording medium 209 as favorites. After that, the already-registered information adding processing proceeds to a step S1108.

In the case of being determined in the step S1106 that the instruction for registering the image file with already-registered information as favorites has not been accepted, the MPU 201 determines whether or not an instruction for deleting the image file with already-registered information has been accepted (the step S1108).

In the case of being determined in the step S1108 that the instruction for deleting the image file with already-registered information has not been accepted, the already-registered information adding processing shown in FIG. 11 is ended. On the other hand, in the case of being determined in the step S1108 that the instruction for deleting the image file with already-registered information has been accepted, the MPU 201 deletes the image file with already-registered information from the recording medium 209 (a step S1109). After that, the already-registered information adding processing shown in FIG. 11 is ended.

According to the preferred embodiment of the prevent invention, immediately after generating the image file, the hash value of the image file is generated, and the information of the image file including the hash value is transmitted to the management system 101. Upon receiving the registration completion notification, which indicates that the processing of registering the information of the image file in the blockchain is completed, the already-registered information is added to the image file. As a result, it is possible to easily confirm the image files whose information has already been registered in the blockchain.

In addition, in the preferred embodiment of the prevent invention, the image file includes image data obtained by photographing a subject. As a result, it is possible to easily confirm the image data whose information has already been registered in the blockchain.

Moreover, in the preferred embodiment of the prevent invention, the image data is the still image data or the moving image data. As a result, it is possible to easily confirm the still image data or the moving image data whose information has already been registered in the blockchain.

In the preferred embodiment of the prevent invention, in accordance with the refine display instruction issued by the user, the image file with already-registered information among the plurality of image files stored in the recording medium 209 is displayed on the image display unit 207. As a result, it is possible for the user to easily grasp (understand) the image files whose information has already been registered in the blockchain.

In addition, in the preferred embodiment of the prevent invention, in accordance with the instruction for registering the image file with already-registered information as favorites issued by the user, the image file with already-registered information among the plurality of image files stored in the recording medium 209 is registered as favorites. As a result, it is possible to easily register the image files whose information has already been registered in the blockchain as favorites.

Moreover, in the preferred embodiment of the prevent invention, in accordance with the instruction for deleting the image file with already-registered information issued by the user, the image file with already-registered information is deleted from the recording medium 209. As a result, it is possible to easily delete the image file with already-registered information from the recording medium 209.

It should be noted that in the step S1102 described above, for example, in the case that the recording medium 209 is removed from the image pickup apparatus 102 and the already-registered information cannot be added to the image file, the user may be notified of a cause of failure in adding the already-registered information. As a result, it is possible for the user to easily grasp (understand) the cause of failure in adding the already-registered information, and thus the user is able to immediately take measures to ensure that the adding of the already-registered information will be successful (the already-registered information will be successfully added).

It should be noted that in the preferred embodiment described above, although the configuration, in which the image pickup apparatus 102 adds the already-registered information to the image file, has been described, the present invention is not limited to this configuration. For example, a configuration may be adopted in which the management system 101 adds the already-registered information to the image file obtained from the image pickup apparatus 102 and transmits the image file, to which the already-registered information has been added, to the image pickup apparatus 102. Even with such a configuration, the same effects as in the preferred embodiment described above can be achieved.

In addition, in the preferred embodiment described above, the moving image data may be data including only audio data. As a result, it is possible to easily confirm the audio data whose information has already been registered in the blockchain.

In addition, in the preferred embodiment described above, the image file with already-registered information may be displayed on the image display unit 207 so as to be distinguishable from an image file, to which the already-registered information has not been added. For example, a predetermined mark or the like, which indicates that the information of the image file has been registered in the blockchain, is displayed near the image file with already-registered information. On the other hand, the above-described predetermined mark or the like is not displayed near the image file, to which the already-registered information has not been added. By performing such a display control, it is possible for the user to easily grasp (understand) the image files whose information has already been registered in the blockchain.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-019929, filed on Feb. 13, 2023, which is hereby incorporated by reference herein in its entirety.

What is claimed is:

1. A management system comprising:
a receiving unit configured to receive a plurality of contents and a plurality of hash values respectively generated based on the plurality of contents;
a determining unit configured to determine whether or not the plurality of contents are related to each other;
a generating unit configured to generate one authenticity guarantee number for the plurality of contents in a case that the plurality of contents are related to each other and generate authenticity guarantee numbers different from each other for the plurality of contents in a case that the plurality of contents are not related to each other; and
a registering unit configured to register the generated one authenticity guarantee number or the generated authenticity guarantee numbers, and the plurality of hash values, in a blockchain, and
wherein the registering unit writes one authenticity guarantee number and a hash value of a content corresponding to the one authenticity guarantee number into one block and connects the one block to the blockchain.

2. The management system according to claim 1, wherein the determining unit determines whether or not the plurality of contents are related to each other based on whether or not the receiving unit has received related information indicating relevance of the plurality of contents.

3. The management system according to claim 1, wherein the plurality of contents are image files generated by photographing a subject with an image pickup apparatus.

4. The management system according to claim 3, wherein the receiving unit receives photographing date and time information of the plurality of contents and information indicating the image pickup apparatus that has photographed the plurality of contents, and
the determining unit determines whether or not the plurality of contents are related to each other based on the photographing date and time information and the information indicating the image pickup apparatus.

5. The management system according to claim 3, wherein the determining unit determines whether or not the plurality of contents are related to each other based on an image similarity degree obtained by performing image analysis of the plurality of contents.

6. The management system according to claim 1, further comprising:
a first receiving unit configured to receive a content subject to authenticity determination and an authenticity guarantee number for identifying the content subject to the authenticity determination; and
an authenticity determining unit configured to determine authenticity of the received content, and
wherein, in determining the authenticity of the received content, the authenticity determining unit compares a hash value generated based on the received content with a hash value registered in the blockchain and corresponding to the received authenticity guarantee number.

7. The management system according to claim 6, wherein in a case that a plurality of hash values corresponding to the received authenticity guarantee number are registered in the blockchain, in determining the authenticity of the received content, the authenticity determining unit determines that the received content is authentic in a case that the hash value generated based on the received content matches any one of the plurality of hash values registered in the blockchain and corresponding to the received authenticity guarantee number, and determines that the received content is not authentic in a case that the hash value generated based on the received content does not match all of the plurality of hash values registered in the blockchain and corresponding to the received authenticity guarantee number.

8. The management system according to claim 6, wherein in a case that a plurality of hash values corresponding to the received authenticity guarantee number are registered in the blockchain, based on codec information of the received content, the authenticity determining unit identifies a hash value to be compared with the hash value generated based on the received content from among the plurality of hash values registered in the blockchain and corresponding to the received authenticity guarantee number.

9. The management system according to claim 6, wherein in a case that a plurality of hash values corresponding to the received authenticity guarantee number are registered in the blockchain, based on size information of the received content, the authenticity determining unit identifies a hash value to be compared with the hash value generated based on the received content from among the plurality of hash values registered in the blockchain and corresponding to the received authenticity guarantee number.

10. The management system according to claim 6, wherein
in a case that a plurality of hash values corresponding to the received authenticity guarantee number are registered in the blockchain, based on photographing condition information of the received content, the authenticity determining unit identifies a hash value to be compared with the hash value generated based on the received content from among the plurality of hash values registered in the blockchain and corresponding to the received authenticity guarantee number.

11. A content management method comprising:
a step of receiving a plurality of contents and a plurality of hash values respectively generated based on the plurality of contents;
a step of determining whether or not the plurality of contents are related to each other;
a step of generating one authenticity guarantee number for the plurality of contents in a case that the plurality of contents are related to each other and generating authenticity guarantee numbers different from each other for the plurality of contents in a case that the plurality of contents are not related to each other; and
a registering step of registering the generated one authenticity guarantee number or the generated authenticity guarantee numbers, and the plurality of hash values, in a blockchain, and
wherein the registering step writes one authenticity guarantee number and a hash value of a content corresponding to the one authenticity guarantee number into one block and connects the one block to the blockchain.

12. A non-transitory computer-readable storage medium storing a program for causing a computer to execute a content management method,
the content management method comprising:

a step of receiving a plurality of contents and a plurality of hash values respectively generated based on the plurality of contents;
a step of determining whether or not the plurality of contents are related to each other;
a step of generating one authenticity guarantee number for the plurality of contents in a case that the plurality of contents are related to each other and generating authenticity guarantee numbers different from each other for the plurality of contents in a case that the plurality of contents are not related to each other; and
a registering step of registering the generated one authenticity guarantee number or the generated authenticity guarantee numbers, and the plurality of hash values, in a blockchain, and
wherein the registering step writes one authenticity guarantee number and a hash value of a content corresponding to the one authenticity guarantee number into one block and connects the one block to the blockchain.

* * * * *